US007642487B2

(12) United States Patent
Silvestro

(10) Patent No.: US 7,642,487 B2
(45) Date of Patent: *Jan. 5, 2010

(54) INTEGRATED ENGINE WELDER AND HYDRAULIC PUMP

(75) Inventor: Nino V. Silvestro, Independence, OH (US)

(73) Assignee: Lincoln Global, Inc., Monterey Park, CA (US)

(*) Notice: Subject to any disclaimer, the term of this patent is extended or adjusted under 35 U.S.C. 154(b) by 655 days.

This patent is subject to a terminal disclaimer.

(21) Appl. No.: 10/911,325

(22) Filed: Aug. 4, 2004

(65) Prior Publication Data

US 2006/0027547 A1 Feb. 9, 2006

(51) Int. Cl.
*B23K 9/10* (2006.01)

(52) U.S. Cl. ...................................... 219/133; 290/1 A

(58) Field of Classification Search ................ 219/133, 219/134; 290/1 A, 1 R, 40 R
See application file for complete search history.

(56) References Cited

U.S. PATENT DOCUMENTS 1,929,887 A * 10/1933 Gustafson .................... 417/27
2,157,871 A 5/1939 Steinert
4,929,816 A * 5/1990 Theurer et al. ................ 219/53
5,669,517 A 9/1997 Donaldson et al.
5,755,306 A 5/1998 Kraemer et al.
5,934,409 A 8/1999 Citron et al.
6,051,809 A 4/2000 Colella
6,172,332 B1 1/2001 Trinkner et al.
6,194,682 B1 2/2001 Schneider
6,263,926 B1 7/2001 Bender et al.
6,296,027 B1 10/2001 Bender et al.
6,596,972 B1 7/2003 Di Novo et al.
6,619,337 B1 9/2003 Vickers
6,670,580 B2 12/2003 Brofft
6,989,509 B2 * 1/2006 Silvestro ..................... 219/133
6,992,265 B2 * 1/2006 Bender et al. ............... 219/133
7,098,424 B2 * 8/2006 Silvestro ..................... 219/133
7,105,774 B2 * 9/2006 Bender et al. ............... 219/133

FOREIGN PATENT DOCUMENTS

CA 2316598 3/2001
CA 2446077 11/2002
CA 2453590 9/2004
WO WO 02/36948 A1 * 5/2002

OTHER PUBLICATIONS

U.S. Appl. No. 09/411,106, filed Oct. 4, 1999.
U.S. Appl. No. 09/683,749, filed Feb. 11, 2002.
U.S. Appl. No. 10/390,436, filed Mar. 17, 2003.
U.S. Appl. No. 10/758,641, filed Jan. 15, 2004.

* cited by examiner

*Primary Examiner*—Kevin P Kerns
(74) *Attorney, Agent, or Firm*—Hahn Loeser & Parks LLP

(57) ABSTRACT

An integrated welder, generator and hydraulic unit that includes a housing that at least partially contains components of a welder, generator and a hydraulic pump. An engine, an electric current generator, and a hydraulic pump are at least partially mounted in the housing. The electric current generator is at least partially connected to the engine to be at least partially driven thereby. The hydraulic pump can be at least partially powered by the electric current generator or the fuel powered engine during the operation of the engine. The integrated welder, generator and hydraulic unit can also include an air compressor.

22 Claims, 11 Drawing Sheets

100
110
112
114
116
118
120
122
124
126
127
127
128
129
130
132
134
136
138
142
144
146
147
148
150
152
154
156
157
158
170
172
174
176
178

100
110
114
118
126
127
129
130
140
144
147
148
157
170
172
174
176
178
180
182
184
188
190
192
194
198
200
210
212
214
216
220
222
230
232
240
242
250
252
254
256
258
260
262
270
V
CK

REG
CK 422
424
410
425
420
400
426
432
432
M
100
430
180

230
GENERATOR
180
MOTOR
192
300
100
250
PUMP
330
CONTROLLER
254
258
150
SWITCH ON/OFF
450
440
LIFT UNIT
LIFT CONTROLS
SWITCH ON/OFF
156
310
152
270
260
HYD TOOL
CK
CK
CK
256
154
262
RESERVOIR
252

INTEGRATED ENGINE WELDER AND HYDRAULIC PUMP

The present invention relates generally to engine driven welding machines, and more particularly to a welder/generator and hydraulic pump unit that can be transported to a site for welding and/or for operating hydraulic equipment.

INCORPORATION BY REFERENCE

Assignee's U.S. Pat. Nos. 6,674,046; 6,989,509; and 6,992,265 are incorporated herein and illustrate several types of integrated welder, generator and compressor units that can be used in combination with the present invention.

BACKGROUND OF THE INVENTION

Engine driven welding machines include a gas powered engine to run a generator which supplies power to the welding electrode. Two such engine welders are disclosed in U.S. Pat. Nos. 6,296,027 and 6,172,332, both of which are incorporated herein by reference. The generator can also be used to operate other electrical equipment (e.g., lights, pumps, etc.). On a construction site, welding equipment and other types of equipment are commonly used. The engine driven welder is commonly used to provide electrical power to electric welders, lights, power tools, etc. Air powered tools and hydraulic equipment are also commonly used at a construction site, warehouses, etc. Such equipment is typically powered by a separate air compressor or a separate hydraulic pump assembly.

While these units have satisfactorily provided power to various types of equipment at various sites, the use of a hydraulic pump assembly and an engine driven welder, or a hydraulic pump assembly, an air compressor and an engine driven welder have some disadvantages. Although the engine welder, hydraulic pump assembly and air compressor are portable, it is nevertheless difficult and time consuming to load and unload these separate units, and then position and setup the various components which are to be used with such units. In addition, these separate units require a certain amount of space in a transport vehicle, thus can result in multiple vehicles having to be used to transport all the components associated with these units. Furthermore, some hydraulic pumps and/or air compressors are powered by electricity. When such electric devices are used at a work site, the hydraulic pump and/or air compressor must be plugged into and powered by an electric power source which may or may not be available or easily available at a particular site.

In an effort to address the past problems associated with the use of a separate engine welder and air compressor, a self contained integrated welder/generator and compressor is disclosed in U.S. Pat. No. 6,051,809, and U.S. Pat. Nos. 6,674,046; 6,989,509; and 6,992,265, which are incorporated herein by reference. These patent and patent applications disclose a self-contained and fully integrated welder/generator and compressor unit. The welder/generator and compressor unit includes a housing that contains the components of the welder/generator and compressor unit (e.g., compressor, generator, welder electronics, engine, fuel tank, etc.). An engine and an electrical current generating alternator are mounted within the housing of the welder/generator and compressor unit. The electrical current generating alternator is connected to the engine to be driven thereby, and the air compressor can be connected by belt or gears to the engine to drive the air compressor or the air compressor can be electrically connected to the electrical current generating alternator to run the air compressor. The housing includes an output panel that includes electrical outlets, welding lead receptacles, air compressor outlets, etc.

Although the prior art integrated engine driven welder and compressor units have addressed the use of an air compressor and an engine welder as a combined unit, there is not such a combined unit for an engine welder and hydraulic pump device. It is not uncommon for a welder to be used with a hydraulic lift to enable an operator to weld components together that are located several feet off the ground. In addition, it is not uncommon that hydraulic tools are used at the same site as an engine welder. These tools include impact wrenches, drills, saws, pullers, crimping tools, press fitting tools, jacks, drivers, tamper, breaker, grinder, hydraulic stands, etc. When hydraulic lifts and/or tools are used at a particular site, a hydraulic pump powered by a fuel powered engine or electric motor must be used to drive a hydraulic pump to provide hydraulic pressure to the lift and/or tools. Although the hydraulic pump and power source for the hydraulic pump can be made for transport to various sites, it is difficult and time consuming to load and unload the hydraulic pump and power source for the hydraulic pump, an engine welder and other tools at a particular site, and then position and setup the various components which are to be used with such units. In addition, these separate units require a certain amount of space in a transport vehicle, thus can result in multiple vehicles having to be used to transport all the components associated with the two units.

In view of the state of the prior art, there remains a need for a single unit that can provide both electrical power for a welding procedure and hydraulic power for use by various types of tools at a work site, and which unit can be easily transported to various work site locations, and which unit is easier to operate and maintain.

SUMMARY OF THE INVENTION

The present invention is directed to an integrated engine driven welder and hydraulic unit that can be conveniently transported to a site for welding and/or for operating hydraulic and/or electric power tools, and can be operated and maintained by a user. The present invention is directed to an integrated engine driven welder, hydraulic unit and air compressor that can be conveniently transported to a site for welding; and/or for operating hydraulic, air powered and/or electric power tools; and can by operated and maintained by a user.

In accordance with one aspect of the present invention, there is provided a self-contained and fully integrated welder/generator and hydraulic unit. The integrated welder/generator and hydraulic unit is provided with a housing to protect the internal components of the welder. At least partially protected by the housing is a fuel powered engine and an electric generator. The fuel powered engine runs the electric generator which in turn produces electricity for the arc welder. The electric generator is selected to produce electricity for various types of arc welders such as, but not limited to, TIG welders, plasma arc welders, SAW welders, MIG welders, STT and other waveform welders. Electric circuitry can be included within the housing to control the amount of current, voltage, power and/or the waveform of current directed to the electrode of the welder. A fuel tank is typically provided within the housing to supply fuel to the fuel powered motor. The fuel tank can be positioned in various areas within the housing, but is generally positioned at or near the base of the housing or engine welder. A filler tube is typically connected to a portion of the fuel tank and extends upwardly from the fuel tank and through a portion of the housing to enable an operator to refill the fuel tank. The filler tube and fuel tank can be made from one or multiple pieces of material. The filler tube and fuel tank are typically made of a durable material such as, but not limited to, plastic and/or a metal material. The engine welder typically includes a control panel to operate various internal components of the welder and/or to provide connectors to various components of the welder. A fixed or adjustable exhaust pipe for the fuel powered engine can be included on the engine powered welder. These and other standard components of an engine driven welder are disclosed in U.S. Pat. Nos. 6,172,332; 6,263,926 and 6,296,027, which are incorporated herein by reference. The engine welder housing can also include one or more storage compartments and/or holders adapted to store and/or hold various welding tools, hydraulic tools, air powered tools, maintenance tools, electrodes, coolant, gas cylinders and/or other supplies on or within the housing. One non-limiting arrangement of the one or more storage compartments and/or holders that can be used is disclosed in U.S. Pat. No. 6,596,972, which is incorporated herein by reference. The engine welder can be transported by a welding carriage; however, this is not required. One non-limiting welding carriage which can be used is disclosed in Assignee's U.S. Pat. No. 6,909,068, which is incorporated herein by reference. The engine powered welder can also include a filler tube and fuel tank arrangement that includes a fuel gauge to monitor the fuel level in the filler tube and/or fuel tank; however, this is not required. The fuel gauge, when used, enables an operator to monitor fuel levels within the filler tube and/or fuel tank to enable an operator to anticipate when the engine welder needs to be refueled and/or to notify an operator during the refueling process of the fuel tank when the fuel tank is filled, thereby avoiding spillage and waste of fuel. The minimizing of spillage can reduce damage to the welder and/or components about the welder, and the time and money required for clean-up of the spilled fuel. One non-limiting configuration of the filler tube and fuel tank that can be used is disclosed in U.S. Pat. Nos. 6,172,332; 6,263,926; 6,296,027; and 6,619,337, which are incorporated herein by reference. A grommet or insert can also be used in the fueling cavity of the housing. The grommet or insert, when used, is designed to at least partially seal the region about the fueling cavity to inhibit and/or prevent fluids from entering the interior of the housing. One non-limiting configuration of a grommet or insert that can be used is disclosed in U.S. Pat. Nos. 6,172,332; 6,263,926; 6,296,027; and 6,619,337. In one embodiment of the invention, the hydraulic unit is at least partially positioned in the housing and at least one component of the hydraulic unit can be connected to the engine (e.g. drive shaft, auxiliary shaft, etc.) and/or electrical alternator in the housing. The hydraulic unit can include one or more hydraulic pumps (e.g., centrifugal pump, piston pump, gear pump, diaphragm pump, Discflo™ pump, global pump, impeller pump, electromagnetic pump, peristaltic pump, vane pump, screw pump, axial flow pump, double acting pump, linear pump, multi-stage pump, reciprocating pump, pneumatic pump, helical pump, etc.) to generate the hydraulic pressure to drive one or more lifts, motors, hydraulic tools and/or other hydraulically powered devices. In another and/or alternative embodiment of the invention, the hydraulic unit can have a hydraulic connector mounted to the housing which is used to connect one or more hoses or tubes to enable pressured hydraulic fluid to run one or more hydraulic devices. In still another and/or alternative embodiment of the invention, the hydraulic pump can be driven by an electric motor connected to the electric generator of the engine welder, an electric motor connected to one or more batteries, an electric motor connected to an electric generating device other than the electric generator (e.g., fuel cell, solar cell, etc.), an electric motor connected to an external electric source, one or more belts connected to at least one rotating shaft of the fuel powered engine of the engine welder, one or more belts connected to at least one rotating shaft of the electric generator, one or more gears connected to at least one rotating shaft of the fuel powered engine of the engine welder, one or more gears connected to at least one rotating shaft of the electric generator of the engine welder, and/or compressed gas (e.g. air). In still yet another and/or alternative embodiment of the invention, the hydraulic unit includes a clutch to engage and disengage the pump from the pump power source or drive of the pump. The clutch is designed to disengage the pump from the power source when a hydraulic tool or other device is not connected to the hydraulic unit and/or is not in use. Such disengagement reduces and/or prevents damage to the pump. The clutch can be a manual and/or automatic clutch. A clutch is typically used when the pump is connected by a belt or gear arrangement to one or more rotating shafts of the fuel powered engine and/or electric generator. In a further and/or alternative embodiment of the invention, an electric switch, which can be manual and/or automatic, is used to activate and/or deactivate an electric motor used to power the pump. The switch can be designed to only operate the pump at certain times and/or under certain conditions to reduce and/or prevent damage to the pump.

In accordance with another and/or alternative aspect of the present invention, the hydraulic unit can be ergonomically positioned within the housing of the engine welder. When the pump of the hydraulic unit is at least partially powered by a gear or a belt arrangement, the pump is typically located near the rotating axle of the fuel powered motor or electric compressor. When the pump is powered by an electric motor, the electric motor and pump can be positioned in a variety of locations in the engine welder housing that has sufficient space for the electric motor and pump. The versatility of positioning the components of the hydraulic unit in the welding housing significantly improves the ease of design of the engine welder.

In accordance with a further and/or alternative aspect of the present invention, the hydraulic unit includes a hydraulic pump, a power drive for the hydraulic pump, hydraulic fluid, an accumulator (e.g., piston type, bladder type, etc.) used to store and/or supply hydraulic fluid, and one or more control valves to control the flow of the hydraulic fluid in the hydraulic unit. The power drive of the hydraulic pump can include an electric motor connected to one or more an internal electric sources (e.g., electric generator, battery, fuel cell, solar cell, etc.) and/or one or more external electric sources (e.g., power outlet, external generator, external fuel cell, external solar cell, etc.), one or more belts and/or gears connected to an internal and/or external drive (e.g., rotating shaft of fuel powered engine of the engine welder, rotating shaft of the electric generator, etc.) and/or pressurized gas (e.g., air, etc.) from an gas compressor that is used to directly or indirectly power the hydraulic pump. The hydraulic unit can also include a shock suppressor to reduce shock or surges during operation of the hydraulic unit. The hydraulic unit can also include one or more pressure and/or flow rate gauges to monitor the hydraulic fluid pressure and/or flow rate in one or more portions of the hydraulic unit. When a clutch and/or switch is used to control the operation of the hydraulic unit, one or more gauges can be used to at least partially control the automatic operation of the clutch and/or switch, and/or provide information to manually operate the clutch and/or switch. In one non-limiting design, the gauge can be designed to send a signal when the detected pressure or flow rate falls below a preset value and/or rises above a preset value. In this design, the signal generated by the gauge can be used to activate the pump when the detected pressure or flow rate is too low or stop the pump when the detected pressure reaches a desired value or is too high and/or the detected flow rate substantially stops. A gauge can be positioned on the housing of the engine welder (e.g., front panel) to enable a user to monitor or read the hydraulic fluid pressure and/or flow rate.

In accordance with still a further and/or alternative aspect of the present invention, the hydraulic unit positioned on and/or at least partially within the housing of the engine welder housing is designed to at least partially power one or more components of a lift unit. The lift unit can be used to elevate an operator to weld objects positioned above the ground. The lift unit typically includes a telescoping boom, articulating boom and/or scissor boom that is used to elevate a platform to enable an operator to welding objects located above the ground. Examples of lift units that can be used are illustrated in U.S. Pat. Nos. 5,669,517; 5,755,306 and 5,934, 409, which are incorporated herein by reference. The power source of the lift unit can include batteries, electric generator, hydraulic power etc. The lift unit can be a self propelled unit or be movable by other vehicles. In one embodiment of the invention, the engine welder of the present invention at least partially supplies power to one or more components of the lift unit. In one aspect of this embodiment, the hydraulic pump associated with the engine welder supplies pressurized hydraulic fluid to one or more components of the lift unit. The pressurized hydraulic fluid can be used to power the boom of the lift, cause the wheels of the lift to rotate when the lift is a self propelled unit, etc. In another and/or alternative aspect of this embodiment, the electric generator associated with the engine welder supplies electric current to one or more components of the lift unit. The supplied electric current can be used to power one or more controls and/or monitors on the lift unit, power one or more electric motors on the lift unit that are used to move the boom and/or cage of the lift unit, move the lift unit if self propelled, power one or more lights on the lift unit, power one or more pumps on the lift unit (e.g., hydraulic pumps, etc.), power one or more air compressors on the lift, charge one or more batteries on the lift unit, etc. In still another and/or alternative aspect of this embodiment, the electric generator and/or hydraulic unit associated with the engine welder substantially supplies all the power to the lift unit. These arrangements can be used to simplify the electronics and/or hydraulic systems that are associated with the engine welder and lift unit. In one particular design, the housing of the lift unit is also used to house one or more components of the engine welder. In this design, the size and/or orientation of the components of the engine welder and lift unit can be optimized to create a more compact design. In another and/or alternative design, one or more components of the engine welder can be located on and/or connected to the cage or lift platform of the lift unit.

In accordance with still yet a further and/or alternative aspect of the present invention, the engine welder includes a gas compressor unit that is at least partially positioned in the housing of the engine welder. The gas compressor unit includes an gas compressor and a power drive for the gas compressor. The power drive for the gas compressor can include an electric motor connected to the electric generator of the engine welder, an electric motor connected to one or more batteries, an electric motor connected to an electric generating device other than the electric generator (e.g., fuel cell, solar cell, etc.), an electric motor connected to an external electric source, one or more belts connected to at least one rotating shaft of the fuel powered engine of the engine welder, one or more belts connected to at least one rotating shaft of the electric generator, one or more gears connected to at least one rotating shaft of the fuel powered engine of the engine welder, one or more gears connected to at least one rotating shaft of the electric generator of the engine welder and/or hydraulic fluid from a hydraulic unit that is used to directly or indirectly power the air compressor. Many types of air compressors can be used (e.g., piston or reciprocating compressors, rotary or screw compressors, centrifugal or axial compressors, etc.). The compressor can have a pressurized air outlet mounted to the housing of the engine welder. In one embodiment of the invention, the compressor unit includes a clutch to engage and disengage the air compressor from the power drive or power source. The clutch is designed to disengage the air compressor from the power drive when an air powered tool or other device is not connected to compressor unit and/or is not in use. Such disengagement reduces and/or prevents damage to the air compressor. The clutch can be a manual and/or automatic clutch. A clutch is typically used when the air compressor is connected by a belt or gear arrangement to one or more rotating shafts of the fuel powered engine and/or electric generator. In another and/or alternative embodiment of the invention, the compressor unit includes a pressurized air receiver or accumulator tank. The pressurized air receiver or accumulator tank can be at least partially mounted in the housing and be connected to the pressurized air output of the air compressor unit. The receiver tank is used to store pressurized air. As can be appreciated, a plurality of receiver tanks can be positioned in the housing of the engine welder. In still another and/or alternative embodiment of the invention, the compressor unit includes one or more pressure monitors and/or pressure valves are designed to at least partially monitor and/or control the air pressure of one or more components of the compressor unit. For instance, a pressure monitor and a pressure valve can be connected to the accumulator tank to monitor and/or display the pressure in the accumulator tank. When the pressure approaches or exceeds a maximum pressure, the pressure monitor and/or a pressure valve at least partially causes a) air to be released from the accumulator tank, and/or b) a slow down and/or disengagement of the air compressor from the power drive to reduce to stop the flow of pressurized air into the accumulator tank. Additionally or alternatively, when the pressure falls below a certain pressure, the pressure monitor and/or a pressure valve at least partially causes a) air to be stored in the accumulator tank, and/or b) engages the power drive of the air compressor to begin or increase the flow of pressurized air into the accumulator tank. As can be appreciated, a pressure monitor and a pressure valve can be connected to other and/or additional components in the housing to monitor the pressure, display the pressure, release the pressure and/or to control the pressure. A pressure gauge can be positioned on the housing of the engine welder (e.g., front panel, etc.) to enable a user to monitor or read the current pressure level in the receiver tank. In still yet another and/or alternative embodiment of the invention, the compressor unit includes a pressure valve that is typically designed to be connected to a hose of an air powered tool or device; however, the pressure valve can be designed to alternatively or additionally connected to other devices (e.g., lift unit, etc.). Typically, the pressure valve is a typical valve used in association with air compressor equipment; however, any type of air pressure valve can be used. The pressure valve is typically located on the front panel of the welder housing; however, the valve can be positioned in other locations. The pressure valve can be designed to send a signal when the pressure valve opens or closes. This signal can be used to at least partially control the activation or deactivation of the power drive of the air compressor.

In accordance with another and/or alternative aspect of the present invention, the engine welder includes an engine that drives an electric generator to create an electrical current that is used to power a particular arc welding process and one or more other electrical devices. The engine welder typically includes one or more circuits to provide standard 120V and/or 240V AC power. Commonly, the exterior of the housing will include one or more outlets that allows one or more external electrical devices to be plugged into the engine welder and to be powered by the engine welder during the operation of the engine in the engine welder. The housing of the engine welder can also or alternatively include one or more circuits to power one or more internal components (e.g. hydraulic unit, compressor unit, etc.). In one embodiment of the invention, the housing of the engine welder includes a switch and/or control circuit to activate and deactivate one or more internal components. The switch and/or control allows the operator to only activate the one or more internal components when needed. The activation/deactivation or on/off switch is typically located on the front face of the engine welder where many of the other control knobs and/or switches are located; however, the activation/deactivation or on/off switch can be located in other areas on the engine welder. In another and/or alternative one embodiment of the invention, one or more automatic and/or manual switches and/or circuits are located internally and/or externally of the housing to control the power source for one or more internal components in the housing. For instance, the one or more internal components can be designed to be powered by one or more power sources (e.g, hydraulic fluid, gear drive, belt drive, internally powered electric motor, externally powered electric motor, etc.). The one or more automatic and/or manual switches and/or circuits can be used to manually or automatically control which power source is to be used to power one or more internal components. For instance, the circuit can be designed to detect whether the fuel powered motor of the engine welder is operating, and if so, cause one or more internal components to be at least partially powered by the fuel powered motor and/or electric generator. The circuit can be also designed to select a hierarchy of available power sources to be used to power one or more internal components.

The principal object of the present invention is to provide an engine welder that can supply power to welding equipment and hydraulic power to one or more hydraulic tools and/or hydraulic devices.

Another object of the present invention is to provide an engine welder that is more convenient and easier to operate.

Still another and/or alterative object of the present invention is to provide an engine welder which is easier to set up and/or transport to various locations.

Yet another and/or alterative object of the present invention is to provide an engine welder which is easy to assemble, easy to connect the welding accessories of a welder to the housing, easy to connect hydraulic tools and/or hydraulic devices to the housing, and/or easy to transport the welding accessories and/or tools along with the engine welder to various locations.

Still yet another and/or alternative object of the present invention is to provide an engine welder that includes a hydraulic pump.

A further and/or alternative object of the present invention is to provide an engine Welder that includes a hydraulic unit that is simple, reliable and durable to use, and which electric hydraulic unit can be ergonomically positioned in the housing of the engine welder.

Still a further and/or alternative object of the present invention is to provide an engine welder that includes a hydraulic pump that can be powered by an electric motor connected to the electric generator of the engine welder, an electric motor connected to an external electric source, one or more belts connected to at least one rotating shaft of the fuel powered engine of the engine welder, one or more belts connected to at least one rotating shaft of the electric generator, one or more gears connected to at least one rotating shaft of the fuel powered engine of the engine welder, one or more gears connected to at least one rotating shaft of the electric generator of the engine welder and/or pressurized air from an air compressor that is used to directly or indirectly power the hydraulic pump.

Another object of the present invention is to provide an engine welder that can supply pressurized air to various types of air tools and/or other air powered devices.

Still another and/or alternative object of the present invention is to provide an engine welder that includes an air compressor.

Yet another and/or alternative object of the present invention is to provide an engine welder that supplies pressurized hydraulic fluid and/or pressurized air to one or more components of a lift unit.

Still yet another and/or alternative object of the present invention is to provide an engine welder that includes one or more components integrated with a lift unit.

Yet another and/or alternative object of the present invention is to provide an engine welder that includes a pressure monitoring system that monitors and/or controls the pressure in one or more components of the engine welder.

These and other objects and advantages of the invention will become apparent to those skilled in the art upon reading and following this description taken together with the accompanying drawings.

BRIEF DESCRIPTION OF THE DRAWINGS

Reference may now be made to the drawings which illustrate various embodiments that the invention may take in physical form and certain parts and arrangements of parts wherein.

DESCRIPTION OF PREFERRED EMBODIMENTS

Figure 1:
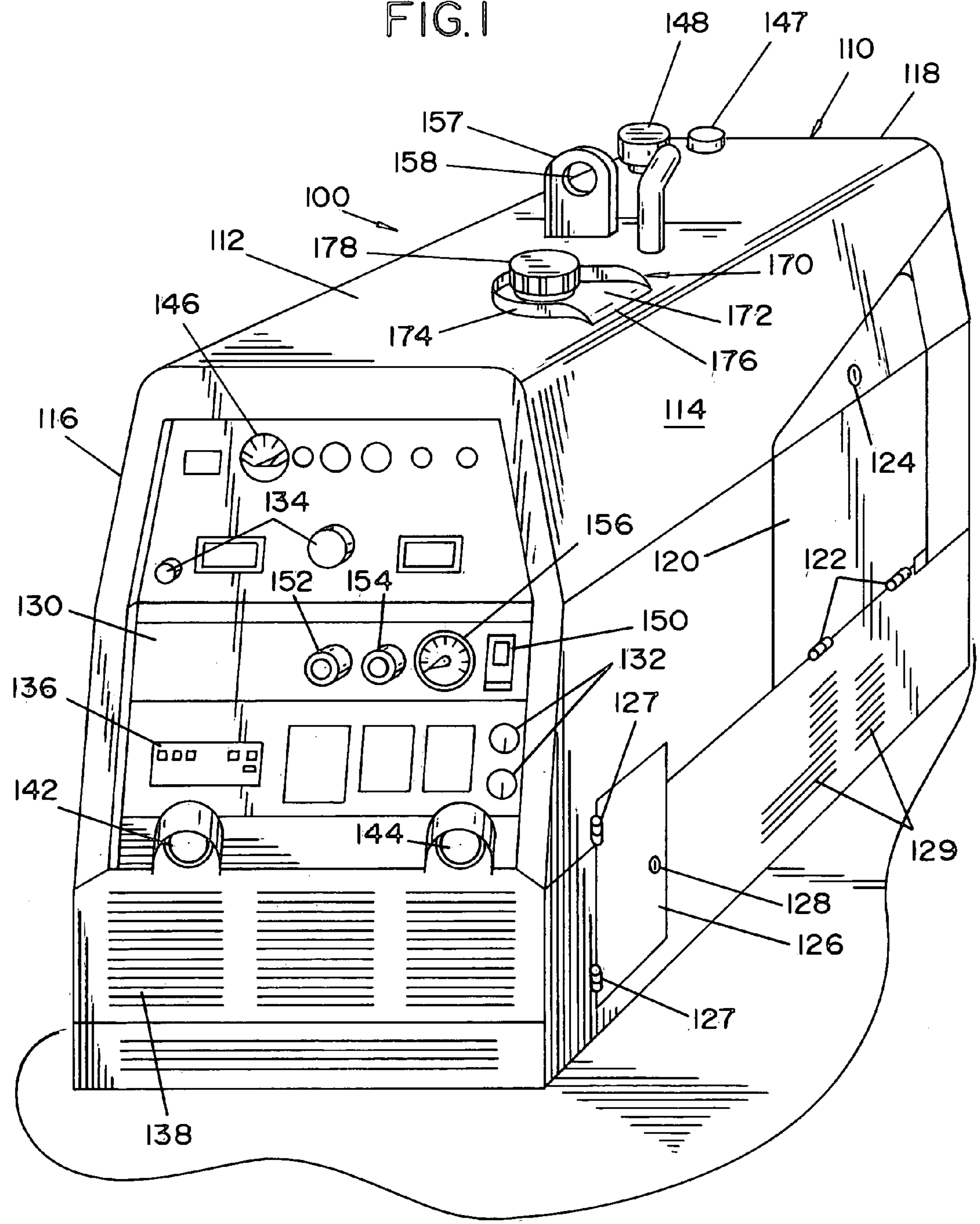
FIG. 1 is a perspective view of an assembled engine welder in accordance with the present invention.

Referring now to the drawings, wherein the showings are for the purpose of illustrating the preferred embodiments of the invention only and not for the purpose of limiting the same, FIGS. 1-4 illustrate various embodiments of the invention. These figures illustrate a self-contained, portable and fully-integrated welder/generator 100 in accordance with the present invention. Unit 100 includes a housing 110 having a top portion 112, two side portions 114, 116, a back side 118 and a front panel 130. The welding housing is designed to encase at least a portion of the internal components of the engine welder. Positioned in the top portion 112 of welding housing 110 is an exhaust pipe 184. The top of the housing typically includes one or more fluid accesses 147, 148 to add coolants, lubricants, etc. to the engine located in the housing. The top of the housing can include a lift device 157 having an opening 158. The lift device, when present, is used to lift and/or move the engine welder by use of a crane or similar apparatus. A grommet 170 is also located on the top portion of the housing. A fuel cap 178 is used to close the opening into the filler tube that is used to fill the fuel tank of the engine welder. An engine access panel 120 is located on side 114 of the housing. The access panel allows a user access to the serviceable components of the engine. The access panel is connected to hinges 122 to enable the panel to be opened. A latch or handle 124 is used to open and close the access panel. Another access opening 126 can be positioned on side 114 closer to the front of the engine welder to allow access to components in the front portion of the housing. The access panel is also connected to hinges 127 to enable the panel to be opened. A latch or handle 128 is used to open and close the access panel. One or more sides of the housing include air vents 129 to allow air flow through the housing so as to facilitate in cooling the internal components of the housing. Housing 110 can include one or more compartments, not shown, that provide a storage area for welding tools, general maintenance tools (e.g., hammer, wrench, screwdriver, etc.), air-powered tools, hydraulic powered tools, electric powered tools, lights, etc.

The front face or panel 130 of housing 110 also includes a vent 138 that allows for air flow within the housing. The front panel also includes various switches, knobs, indicator lights and meters and gauges 132, 134, 136 to monitor and/or control the operation of the welder/generator. The front panel also includes electrical connectors 142, 144 to connect a welding gun and/or other electrical equipment to the welder/generator. Typically the front face includes at least one 120 volt connector and at least one 240 volt connector; however, other combinations can be used (e.g., two 120 volt connectors, two 240 volt connectors, etc.). As can be appreciated, the voltage rating can be other than 120 and/or 240 volts (e.g. 230V, 277V, 380V, 400V, etc.). As can be further appreciated, one or more volt connectors can be positioned on the front face and/or other locations on the welder/generator. The front panel and/or one or more other regions of the welder/generator can include one or more features of the welder/generator and compressor unit, e.g., an on/off key slot, a start button for the internal combustion engine, one or more circuit breakers, a light, voltage and/or current meters, welding current settings, warning indicators, time meters, circuit breakers, remote control connectors, choke controls, etc. One non-limiting design for the front panel of the engine welder is similar to that of the RANGER series of engine welders offered by The Lincoln Electric Company. As can be appreciated, many other configurations can be used based on desired aesthetics of the front panel, engine welder functions, etc. The engine welder can be used for stick welding, TIG welding, MIG welding, flux cored welding and/or gouging. The engine welder can also be designed for use with a wire feeder.

Referring now to FIG. 1, the front panel of the housing includes a hydraulic pump switch 150 to activate and deactivate the operation of a hydraulic pump. Two hydraulic fluid connectors 152, 154 are positioned on the front panel to supply hydraulic fluid to various types of hydraulic powered tools. As can also be appreciated, the hydraulic fluid connectors can be located on other regions of the housing. In addition, the hydraulic pump switch can be located in other regions of the housing. A hydraulic fluid gauge 156 is positioned on the housing to provide information on the pressure level of the hydraulic fluid flowing from at least one of the hydraulic fluid connectors. As can be appreciated, the switch, hydraulic fluid connectors and/or hydraulic fluid gauge can be located on other areas of the housing.

Figure 2:
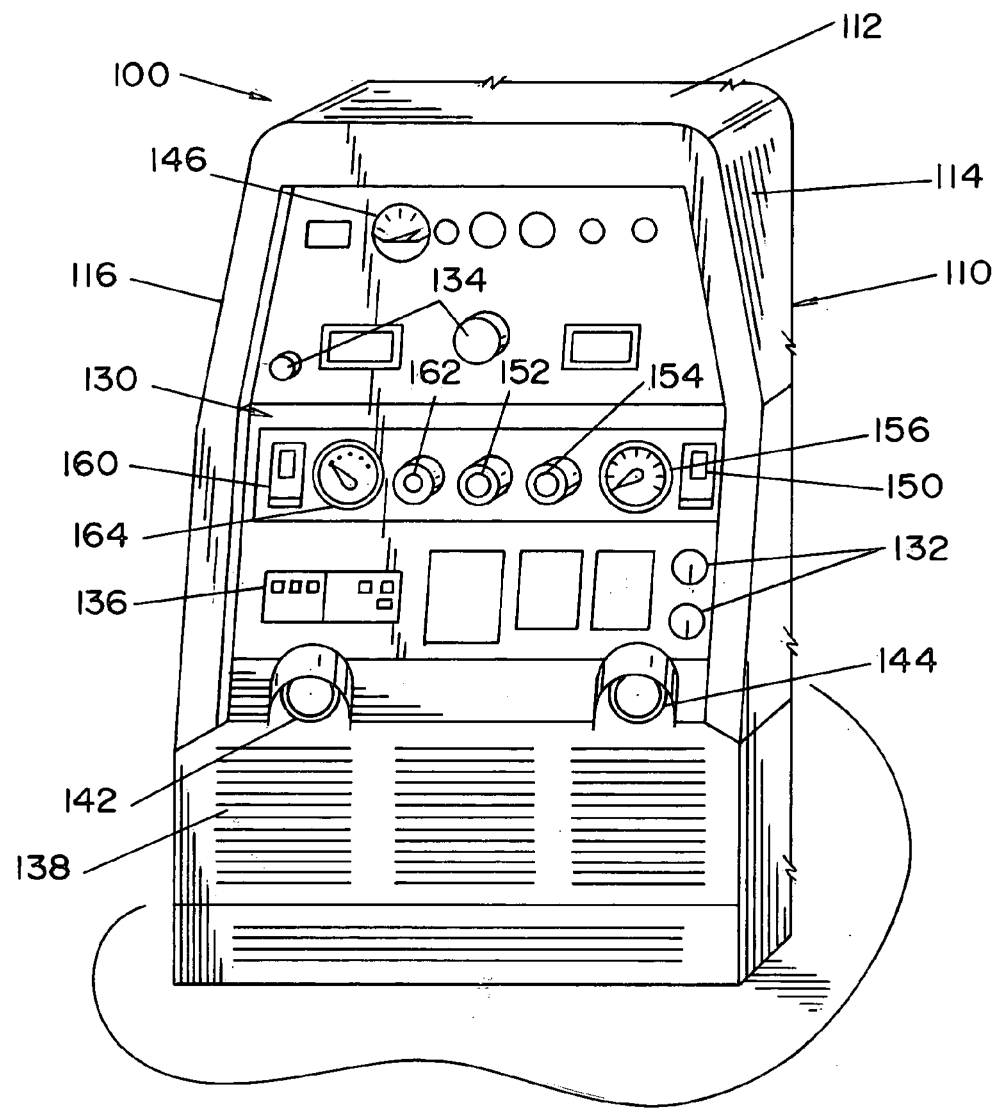
FIG. 2 is a front elevation view of another configuration of the engine welder.

Referring now to FIG. 2, a modified front panel of the housing is illustrated. The front panel has all the components of the front panel shown in FIG. 1 and further includes an air compressor switch 160 to activate and deactivate an air compressor. The front panel also includes a pressurized air outlet 162 used to connect to an air pressure hose that supplies pressurized air to various types of air powered tools. An air pressure gauge 164 is also positioned front panel to provide information on the pressure level of the air being expelled from the pressurized air outlet. As can be appreciated, more than one pressurized air outlet can be positioned on the front panel. As can also be appreciated, one or more pressurized air outlets can be located on other regions of the housing. In addition, the air compressor switch and/or pressure gauge can be located in other regions of the housing.

Figure 3:
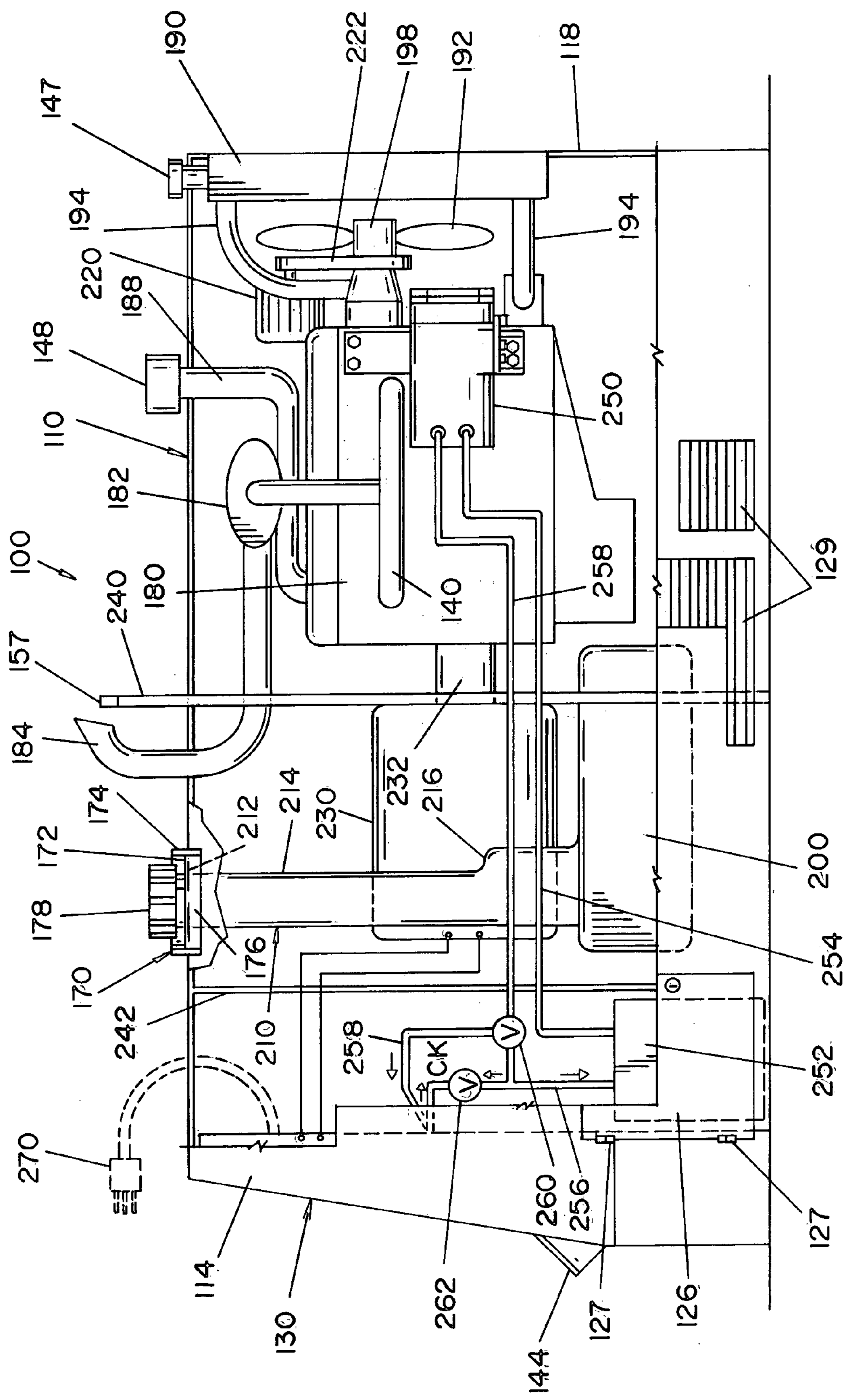
FIG. 3 is a partial cut away view of the side of the engine welder of FIG. 1 or 2.
Figure 4:
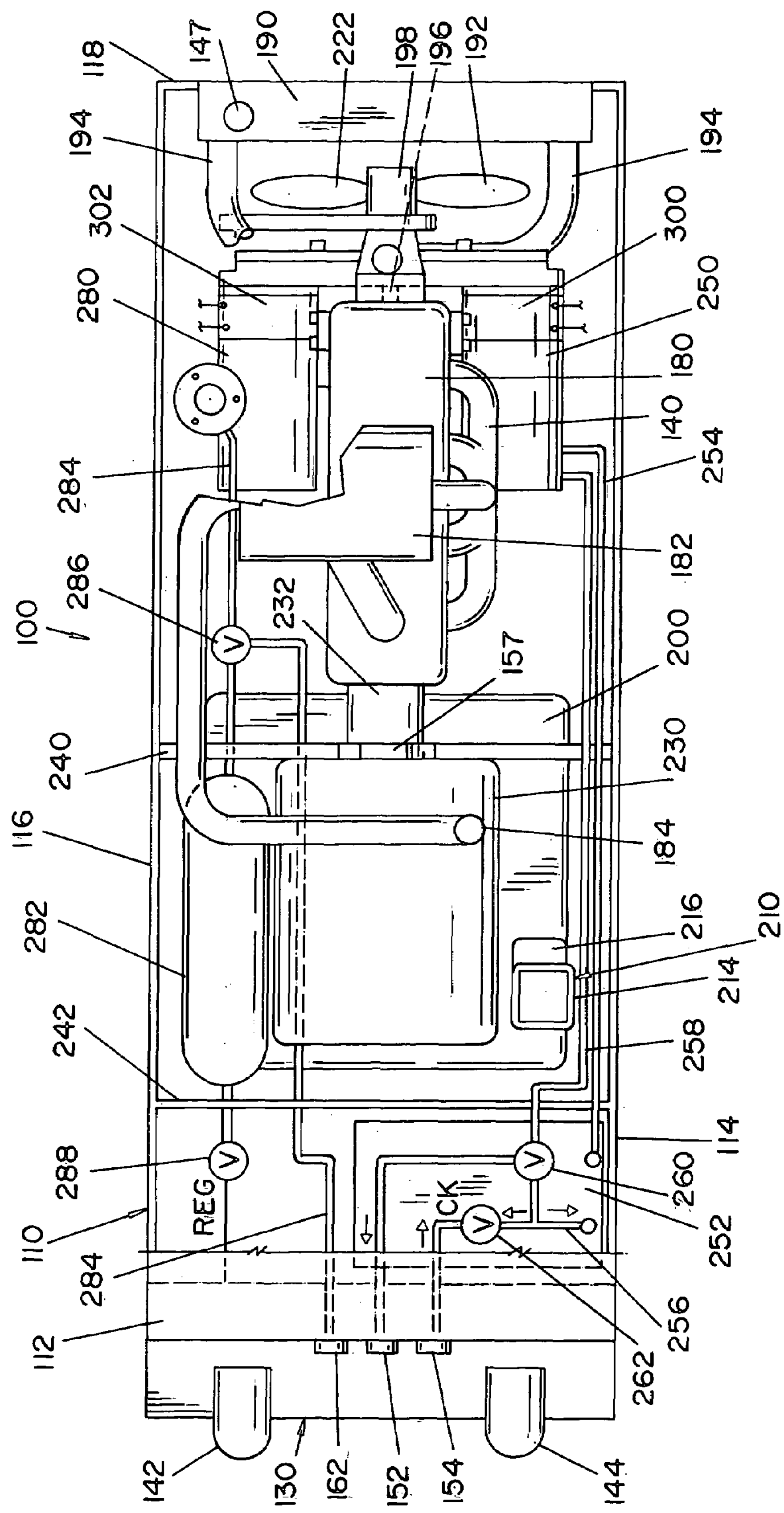
FIG. 4 is a partial cut away view of the top of the engine welder of FIG. 1 or 2.

Referring now to FIGS. 3 and 4, an internal combustion engine 180 is contained within and mounted at one end of the housing 110. The internal combustion engine is typically provided with an exhaust manifold 140, an air cleaner, a muffler 182, an exhaust pipe 184, an oil filler tube 188 and a battery (not shown) to start the engine. A radiator 190 and fan 192 are included in the housing to cool the engine. Coolant tubes 194 allow the coolant to flow from the radiator into the engine. The coolant access 147 on the top of the housing allows a user to add coolant and/or monitor the coolant level in the radiator. A fuel tank 200 located in the base of the housing supplies fuel to the engine. Typically, the fuel tank is secured to the bottom of the housing. Positioned on the top region of fuel tank 200 is a filler tube 210 which extends upwardly from the fuel tank and to a tube access opening 212 in the top of housing 110. The filler tube and the fuel tank are shown to be made of a one-piece material; however, the filler tube can be connected to the fuel tank in other arrangements (e.g. weld, solder, adhesive, etc.). The filler tube is also illustrated as being formed from a single piece of material; however, the filler tube can be formed from multiple components. The fuel tank and filler material can be made of the same or different materials. The filler tube includes a top portion 214 and a bottom portion 216. The base of the filler tube has a larger cross-sectional area than top of the filler tube. The cross-sectional shape of the filler tube is shown to be generally rectangular. The bottom portion of the filler tube has a larger diameter rectangular cross-sectional area than the rectangular cross-sectional area of the top portion. A majority of the bottom portion of the filler tube is shown to have a substantially constant cross-sectional area. Close to the top region of the bottom portion, the cross-sectional area tapers downwardly at a transition area until obtaining the size of the cross-sectional area of the top portion. The cross-sectional area of the top portion is illustrated as being substantially uniform along the complete longitudinal length of the top portion. As a result, the bottom portion of said filler tube has a cross-sectional area that is greater than any region in the top portion of the filler tube. As can be appreciated, other cross-sectional shapes can be used for the top and/or bottom portion of the filler tube. The large cross-sectional area and volume of the bottom portion of the filler tube is designed to reduce the rate at which the fuel rises in the filler tube after the fuel tank has been filled. The reduced rate that the fuel rises in the filler tube during the filling of the filler tube with fuel allows an operator more time to terminate the flow of fuel into the filler tube once the operator is notified or learns from the fuel level indicator that the fuel tank is filled.

As best shown in FIGS. 1 and 3, the top of the filler tube extends through the access opening on the top of the housing and through grommet 170. Grommet 170 is inserted into tube access opening 212 and seals the tube access opening to inhibit or prevent fluids from entering the interior of the housing. The grommet is also designed to direct fuel that inadvertently spills into the grommet to a side of the engine welder. The grommet is generally a one-piece structure made of a flexible material such as rubber. As can be appreciated, the grommet can be a multi-piece structure that is connected together by various means (e.g. heat, adhesive, etc.). Grommet 170 includes a base surface 172 and a side wall 174 that extends about the outer perimeter of the grommet. The base surface and side wall form an internal cavity in the grommet. A tube opening is positioned in the base surface of the grommet. The shape of the tube opening is selected to enable the top of the filler tube to extend through the tube opening and to form a seal about the filler tube. Typically the tube opening closely matches the cross-sectional shape of the top of the filler tube or top fill section that extends through the tube opening. The grommet can be secured in the access opening in a variety of ways. Grommet 170 is shown as including a lip 176. The lip is illustrated as partially curving over a side of the housing of the engine welder. The lip is designed to direct fluids that have inadvertently spilled into the grommet internal cavity to flow outwardly from the cavity and over the side of the side of the housing. As such, the lip facilitates in the flow of fluids from the internal cavity of the grommet. The grommet can be designed so that when the grommet is secured in the tube access opening, the base surface of the grommet slopes downwardly toward the lip. The sloped base surface causes fluids which have inadvertently spilled into the internal cavity of the grommet to flow out of the internal cavity and onto the lip and then over the side of the housing. The sloped surface also causes the fluid flowing from the internal cavity of the grommet to accelerate as the fluid approaches the lip. The faster moving the fluid facilitates in the fluid flowing over the lip.

A fuel level monitor is typically used to indicate the level of fuel in the fuel tank. The fuel level monitor includes a fuel gauge 146 located on the front panel of the housing and a fuel level sensor (not shown) located in the fuel tank and/or filler tube. The fuel lever sensor is designed to measure one or more fuel levels in the fuel tank. The fuel level sensor can be designed to use mechanical, chemical and/or electrical means to detect a fuel level. The fuel level indicator provides the operator with information on the amount of fuel left in fuel tank, thereby providing the operator with information to determine whether a particular operation should be started and completed prior to the fuel in the fuel tank being exhausted. If an operator determines that the operation will take more time than the amount of fuel in the fuel tank can provide to run the engine, the operator can re-fill the fuel tank prior to operation so that the operation does not have to be prematurely terminated and restarted due to the engine running out of fuel. The fuel gauge can include a light to illuminate when one or more detected fuel levels in the fuel tank and/or filler tube are detected, or illuminate when the fuel level monitor is in operation. A audible alarm (not shown) can be included on the housing. The audible alarm, when used, is designed to make a sound when one or more detected fuel levels in the fuel tank and/or filler tube are detected. The audible alarm can be designed to generate different sounds and/or sound levels for different detected fuel levels. The audible alarm can include a light to illuminate when one or more detected fuel levels in the fuel tank and/or filler tube are detected. The light, like sound, is used to draw the operator's attention to the fuel gauge. The audible alarm is used to draw an operator's attention to the fuel gauge so as to notify the operator that a particular fuel level in the fuel tank has been reached and/or exceeded. During the fueling of the engine welder, the operator may become distracted. The audible alarm is useful in regaining the attention of the operator during the fueling process so that proper monitoring of the level of fuel in the fuel tank occurs during the fueling process. As can be appreciated, the audible alarm can be used as a back up monitor in the instances wherein the fuel gauge fails or provides an inaccurate fuel level reading. The fuel level monitor, when used, can be electrically powered and/or be mechanically operated. When the fuel level monitor is electrically powered, the fuel level monitor can be can powered by the electricity generated by the engine welder during operation of the engine welder and/or powered by a alternative or additional power source (e.g., battery, solar cell, fuel cell, etc.).

Referring again to FIGS. 3 and 4, an electric current generator 230 is mounted within the housing 110. The electric current generator is connected to internal combustion engine 180 by a motor shaft 232. The motor shaft is typically directly connected to electric current generator 230; however, a gear box and/or belt drive, not shown, can be inserted therebetween to control and/or regulate the speed at which the electric current generator is operated by internal combustion engine 180. In one particular, non-limiting arrangement, internal combustion engine 180 is a water cooled and/or air cooled engine. The engine is designed to operate at a nominal speed of 1800 RPM with a 4-pole generator design or 3600 RPM with a 2-pole generator design. The auxiliary power provided by the electric current generator is normally about 60 hertz so as to be able to run standard power tools and lights. As can be appreciated, other sized engines and/or alternators can be used. Engine 180 typically includes an auxiliary drive output shaft 196. A primary drive 198 is typically connected to the cooling fan 192. The primary drive 198 may also drive an alternator 220 by fan belt 222 to charge a battery (not shown). As shown in FIGS. 3 and 4, the housing is divided into several sections by internal wall partitions 240, 242. The partition walls provide structural strength to the housing and divide the internal components of the housing from one another. The division of the internal components by the partition walls also can be used to protect the components from one another. Partition wall 240 divides the section containing the combustion engine from the section containing the electric generator. Motor shaft 232 passes through an opening in partition wall 240. Typically located in the same section as the electrical generator is the electrical circuitry used to generate the arc currents of the engine welder through electrical connectors 142 and 144. As can be appreciated, one or more electrical circuits can be located on other regions in the housing. A contact connector/switch 300 is also positioned in the section between partitions 240, 242. Typically the power from the electric generator is 120V or 240V power.

Referring again to FIGS. 3 and 4, a hydraulic pump 250 is mounted within housing 110. The hydraulic pump can be a belt driven, gear driven or electric pump. When the hydraulic pump is belt driven or gear driven, the belt(s) or gear(s) are typically connected or interconnected to a drive shaft of the combustion engine. If the combustion engine includes an auxiliary drive shaft, the belt(s) or gear(s) are typically interconnected to such drive, otherwise the belt(s) or gear(s) are connected or interconnected to the main drive shaft of the combustion engine. As can be appreciated, the belt(s) or gear(s) can be connected or interconnected to other rotating or reciprocating shafts in the housing of the engine welder. A clutch can be used in conjunction to a belt or gear driven pump to control the speed and/or operation of the pump. When the hydraulic pump is driven by an electric motor, the power for the electric motor can be supplied from generator 230 and/or from an external source via electric plug 270. As can also be appreciated, plug 270 can be stored in a compartment in the housing (not shown). The use of plug 270 allows a user to operate the hydraulic pump without having to start and operate engine 180 of the engine welder. Hydraulic pump switch 150 is typically used to activate or deactivate the hydraulic system. In one arrangement, the switch electrically connects or disconnects the electric motor on the hydraulic pump from a power source. In another arrangement, the switch activate and/or deactivate the clutch that is used to engage and disengage the hydraulic pump to one or more belt(s) or gear(s) used to drive the hydraulic pump. As can be appreciated, the switch can be used in other or additional arrangements to activate and/or deactivate the hydraulic system. Hydraulic pump is illustrated as being positioned near the rear of the engine welder; however, it will be appreciated that the hydraulic pump can be located in other regions of the engine welder, especially when the hydraulic pump is driven by an electric motor. The hydraulic pump is designed to pump hydraulic fluid through a hydraulic system that is at least partially located within housing 110. Many types of hydraulic pumps can be used depending on size, cost and/or intended use of the hydraulic system. As can be appreciated, more than one hydraulic pump can be used in the hydraulic system. In the arrangement illustrated in FIG. 3, hydraulic pump 250 is supplied hydraulic fluid from one or more reservoirs 252. The reservoir is illustrated as being position within the housing; however, this is not required. The hydraulic fluid from reservoir 252 flows through pipe or tube 254 and into the hydraulic pump. The hydraulic pump then pumps the hydraulic fluid through pipe or tube 258 to a valve 260. Valve 260 either directs the hydraulic fluid to hydraulic fluid connector 152 or to reservoir 252 through line 256. The hydraulic fluid flowing back to the engine welder passes through fluid connector 154 and through check valve 262 and into reservoir 252. The check valve is used to inhibit or prevent the back flow of hydraulic fluid through fluid connector 154. As can be appreciated, the operation of one or more valves of the hydraulic system can be manual, semi automatic and/or automatic. The fluid pressure gauge 156 is typically connected to line 258 and/or fluid connector 152 to indicate the pressure of the hydraulic fluid. The fluid pressure gauge and/or another pressure monitor can be designed to generate a signal that is used to control the operation of the hydraulic pump and/or valve 260. In one non-limiting design, the fluid pressure gauge and/or another pressure monitor generates a signal that is used to terminate the operation of the hydraulic pump when a certain pressure level of the hydraulic fluid is detected and/or if no flow of hydraulic fluid through fluid connector 152 is detected. Such an arrangement can facilitate in inhibiting or preventing unnecessary operation of the hydraulic pump. As can be appreciated, other and/or additional control arrangements for the hydraulic system can be used.

Referring now to FIG. 4, an air compressor system is illustrated as being incorporated in the housing along with a hydraulic system. The incorporation of an air compressor system in the housing is optional. The air compressor system includes an air compressor 280 that is mounted within housing 110. The air compressor can be belt driven, gear driven, hydraulic fluid driven, or driven by an electric motor. When the hydraulic pump is belt driven or gear driven, the belt(s) or gear(s) are typically connected or interconnected to a drive shaft of the combustion engine. If the combustion engine includes an auxiliary drive shaft, the belt(s) or gear(s) are typically interconnected to such drive, otherwise the belt(s) or gear(s) are connected or interconnected to the main drive shaft of the combustion engine. As can be appreciated, the belt(s) or gear(s) can be connected or interconnected to other rotating or reciprocating shafts in the housing of the engine welder. A clutch can be used in conjunction to a belt or gear driven air compressor to control the speed and/or operation of the air compressor. When the air compressor is driven by an electric motor, the power for the electric motor can be supplied from generator 230 and/or from an external source via electric plug 270. The use of plug 270 allows a user to operate the air compressor without having to start and operate engine 180 of the engine welder. Air compressor switch 160 is typically used to activate or deactivate the air compressor system. In one arrangement, the switch electrically connects or disconnects the electric motor on the air compressor from a power source. In another arrangement, the switch activates and/or deactivates the clutch that is used to engage and disengage the air compressor to one or more belt(s) or gear(s) used to drive the air compressor. As can be appreciated, the switch can be used in other or additional arrangements to activate and/or deactivate the air compressor system. The air compressor is illustrated as being positioned near the rear of the engine welder; however, it will be appreciated that the air compressor can be located in other regions of the engine welder, especially when the air compressor is driven by an electric motor. Many types of air compressors can be used depending on size, cost and/or intended use of the air compressor system. As can be appreciated, more than one air compressor can be used in the air compressor system. One or more air accumulator tanks 282 are fluidly connected to air compressor 280. The air accumulator tanks are positioned in the housing; however, this is not required. A pipe or hose 284 conveys air from the compressor to the air accumulator tank. The air compressor system includes pressure gauge 164 that monitors the air pressure in one or more of the air accumulator tanks. The air compressor system also includes a control valve 286 that can be used to regulate the flow of air into and/or out of the one or more of the air accumulator tanks. The control valve can be manually, semi-automatic and/or automatically controlled to direct compressed air from the air compressor into one or more air accumulators and/or to direct compressed air from the air accumulators and/or air compressor through pipe 284 to air outlet 162. The air compressor system also includes a pressure release valve 288 to control the pressure in one or more accumulator tanks. The pressure release valve can be manually, semi-automatically and/or automatically controlled so as to inhibit or prevent over pressurization of one or more accumulator tanks. The pressure gauge 164 and/or one or more other pressure monitors can be used to generate a signal that is in turn used to control the operation of air compressor, pressure valve 286 and/or pressure release valve 288. In one non-limiting design, the pressure gauge generates a signal that is used to terminate the operation of the air compressor when a certain pressure level is detected in one or more accumulators and/or if no air flow is detected through air outlet 162. Such an arrangement can facilitate in inhibiting or preventing unnecessary operation of the air compressor and/or over pressurization of one or more accumulators. In another non-limiting design, the pressure gauge generates a signal that is used to activate the operation of the air compressor when a certain pressure level is detected in one or more accumulators and/or if air flow is detected through air outlet 162. Such an arrangement can facilitate in inhibiting or preventing under pressurization of the air accumulator tanks during the use of the air compressor system. As can be appreciated, other and/or additional control arrangements for the air compressor system can be used.

Figure 6:
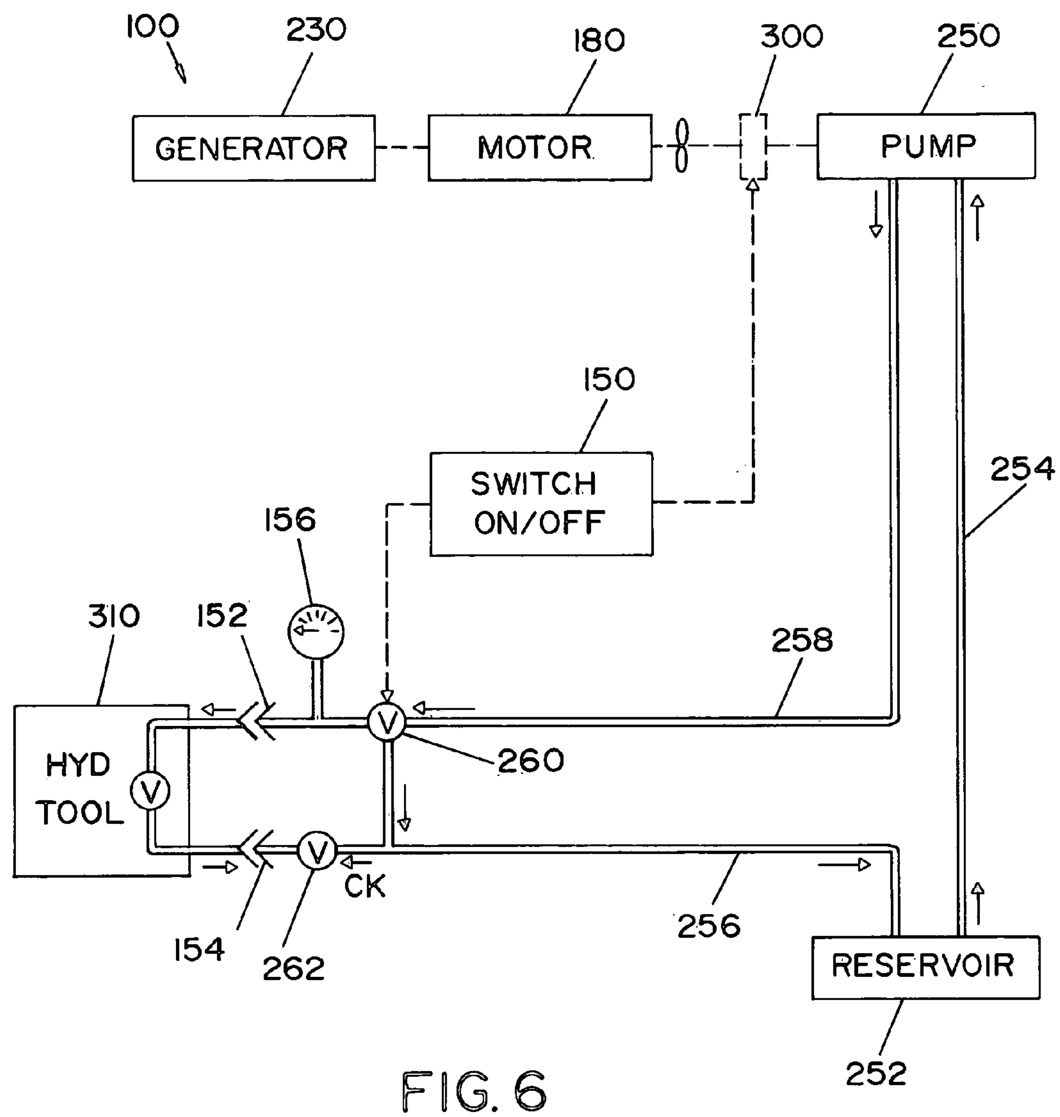
FIG. 6 is a schematic representation of a hydraulic unit integrated with an engine welder.

Referring now to FIGS. 6-10, various schematic representations are illustrated concerning the integration of a hydraulic unit with an engine welder. Referring to FIG. 6, there is illustrated a hydraulic pump that is directly connected to the motor or interconnected to the motor via a clutch 300. Hydraulic pump 250 can be connected or interconnected to motor 180 by one or more belts and/or gears. The dotted line representation for clutch 302 indicates that this component is an optional component. As shown in FIG. 6, hydraulic pump switch 150 controls the operation of clutch 300 so as to control the operation of hydraulic pump 250. When the hydraulic unit is activated by switch 150, hydraulic pump 250 is operated by motor 180. Hydraulic fluid is drawn from reservoir 252 through pipe 254 into the pump and is pumped out of the pump through pipe 258 to valve 260. Valve 260 is indicated as also being controlled by hydraulic switch 150. Hydraulic fluid gauge 156 indicates the pressure of the hydraulic fluid in pipe 258. Valve 260 controls the flow of hydraulic fluid in pipe 258 into hydraulic fluid connector 152. A hydro tool 310 is operated by hydraulic fluid from the engine welder when it is connected to hydraulic fluid connectors 152, 154. Check valve 262 ensures that the hydraulic fluid properly flows through the hydraulic fluid connectors.

Figure 7:
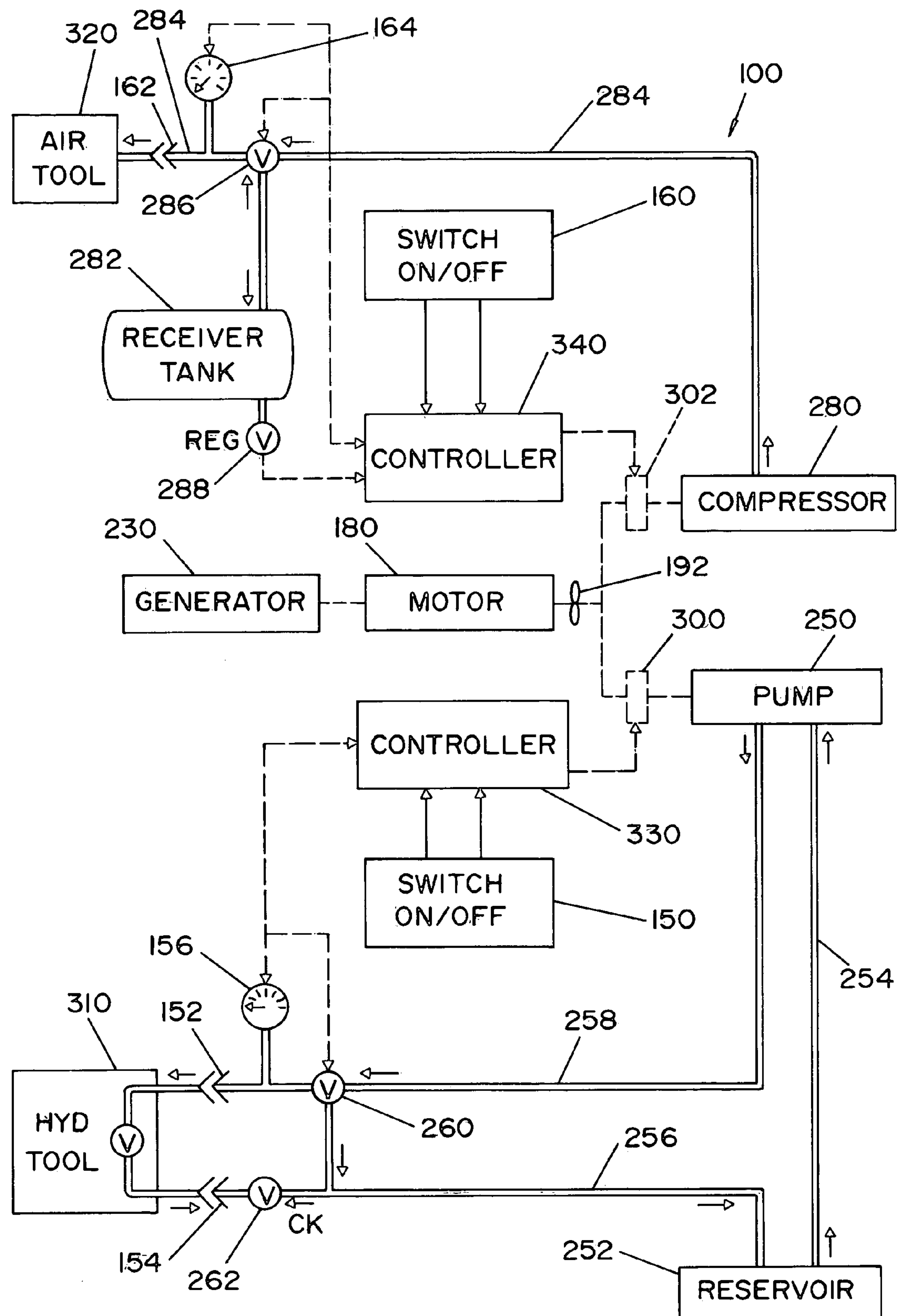
FIG. 7 is a schematic representation of a hydraulic unit and a compressor unit integrated with an engine welder.

Referring now to FIG. 7, a schematic representation of a hydraulic unit and an air compressor unit integrated into an engine welder is set forth. Hydraulic pump 250 is illustrated as being directly connected to or interconnected via a clutch 300 to motor 180. Hydraulic pump 250 can be powered by one or more gears or belts that are connected or interconnected to motor 180. The operation of the hydraulic unit illustrated in FIG. 7 is similar to the operation as set forth in FIG. 6. A controller 330 is illustrated in FIG. 7 as receiving input from one or more components of the hydraulic unit and/or controlling the operation of one or more components of the hydraulic unit. For instance, controller 330, when activated by pump switch 150, can detect the pressure in pipe 258 via pressure gauge 156 and use such information to activate or deactivate hydraulic pump 250. Controller 330 can also be designed to operate valve 260 to control the flow of the hydraulic fluid through hydraulic fluid connectors 152, 154. The air compressor 280 of the air compressor unit is also illustrated as being directly connected or interconnected via clutch 302 to motor 180. The air compressor can be driven by one or more gears or belts that are directly connected to motor 180 or interconnected to motor 180 via clutch 302. A controller 340 is illustrated as controlling the operation of air compressor 280 when activated by air compressor switch 160. During the operation of air compressor 280, compressed air is directed through pipe 284 to a control valve 286 which in turn directs air into an accumulator tank 282 and/or through pressure outlet 162. An air pressure gauge 164 indicates the pressure of the compressed air in the accumulator tank and/or flowing through air outlet 162. An air tool 320 can be connected to air outlet 162 so as to be operated by the air compressor unit in the engine welder. Controller 340 is illustrated as being potentially connected to regulation valve 288, control valve 286, pressure gauge 164 and/or clutch 302. Controller 340 can be designed to receive information from one or more of these components so as to control the operation of one or more components based upon the information received. For instance, pressure information received from pressure gauge 164 can be used by controller 340 to open and close pressure release valve 288 so as to not over-pressurize the air compressor unit. Alternatively or additionally, controller 340 can use the information received from pressure gauge 164 to control the operation of control valve 286 to re-pressurize the accumulator tank and/or to direct compressed air out through air outlet 162 and into an air tool 320. Alternatively and/or additionally, the information received from pressure gauge 164 can be used by controller 340 to activate and/or deactivate air compressor 280 directly and/or indirectly via clutch 302. As can be appreciated, many other and/or additional control arrangements can be incorporated into the air compressor unit.

Figure 8:
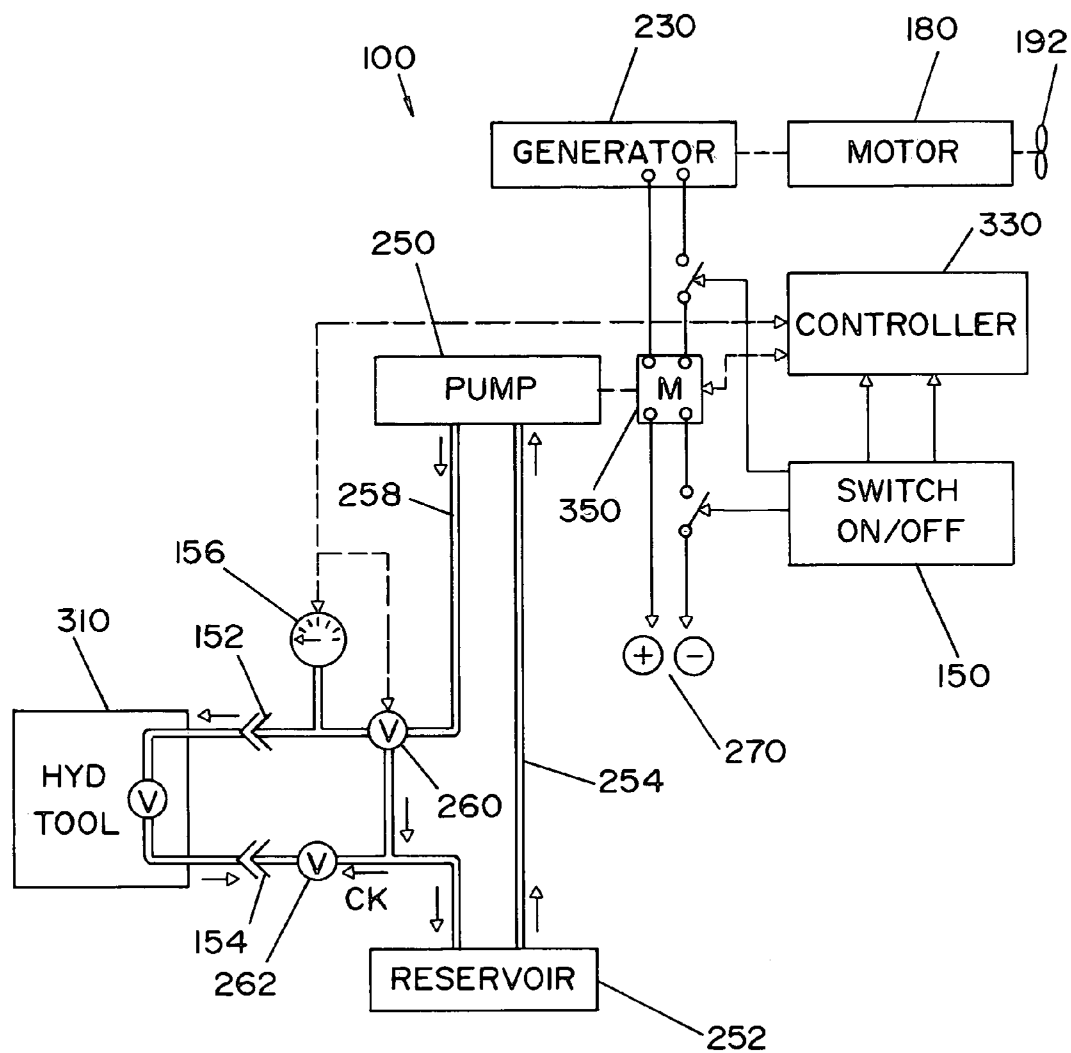
FIG. 8 is another schematic representation of a hydraulic unit integrated with an engine welder.

Referring now to FIG. 8, a hydraulic unit is illustrated as being incorporated into an engine welder similar to the arrangement disclosed in FIG. 6. As illustrated in FIG. 8, hydraulic pump 250 is operated by an electric motor 350. The electric motor can be powered by electric generator 230 and/or an external power source via electric plug 270. Controller 330 is illustrated as receiving and/or transmitting information or instructions to one or more components of the hydraulic unit so as to control one or more components of the hydraulic unit.

Figure 9:
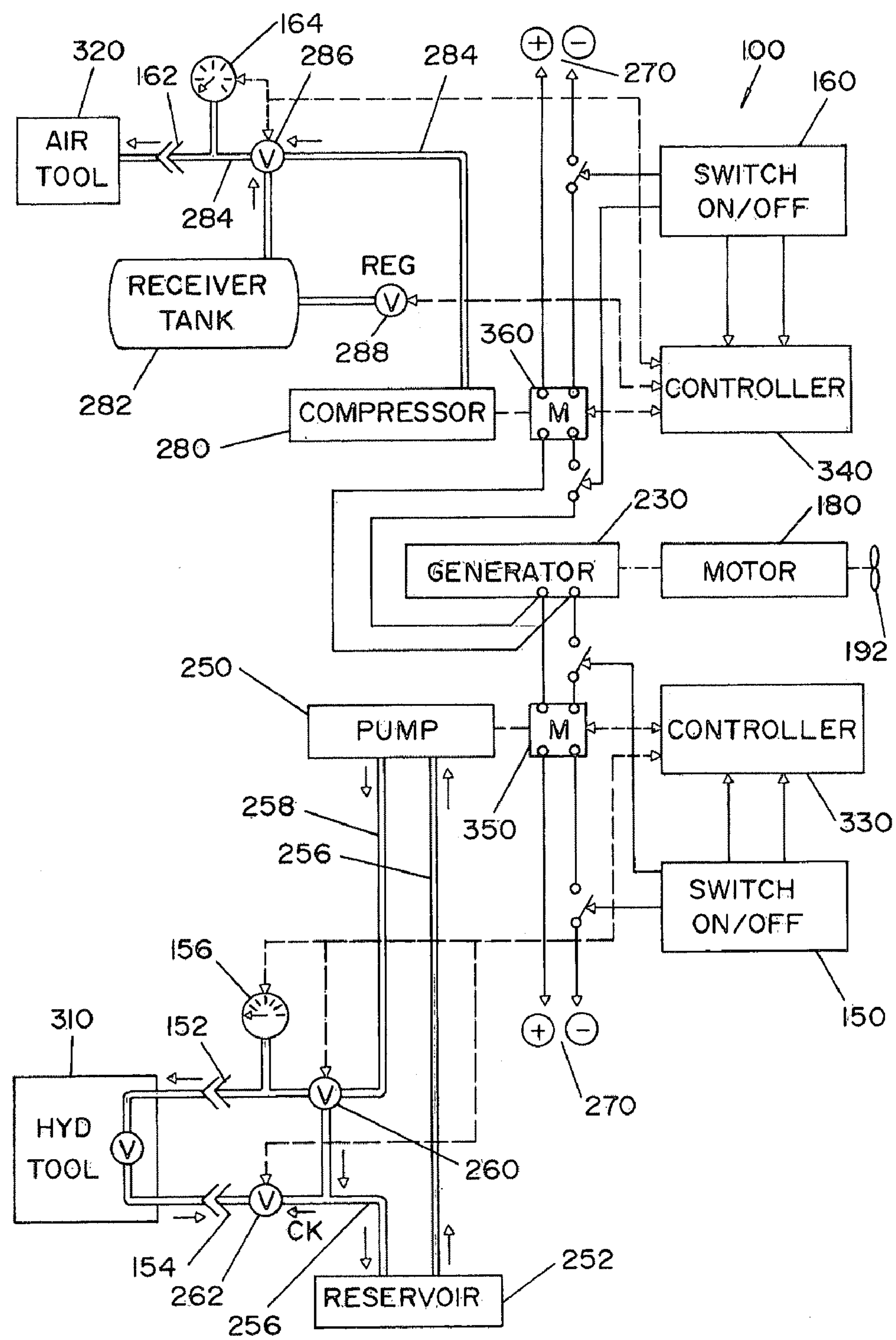
FIG. 9 is another schematic representation of a hydraulic unit and a compressor unit integrated with an engine welder.

Referring now to FIG. 9, there is illustrated a hydraulic unit and a compressor unit incorporated into an engine welder similar to the schematic illustrated in FIG. 7. In FIG. 9, both the hydraulic pump 250 and the air compressor 280 are operated by electric motors 350, 360, respectively. The electric motors can be powered by electric generator 230 and/or by an external power source via electric plug 270. Controllers 330 and 340 are designed to receive and/or transmit information to one or more components of the hydraulic unit and/or air compressor unit, respectively, and to operate one or more components of these units based upon the information received and/or pre-programmed or preset in the controller. As can be appreciated, the hydraulic pump 250 and/or air compressor 280 can be powered in different ways. For instance, hydraulic pump 250 can be powered by an electric motor and air compressor 280 can be driven by motor 180 via one or more gears or belts. Similarly, air compressor 280 can be powered by an electric motor 360 while hydraulic pump 250 is driven by motor 180 via one or more belts or gears.

Figure 10:
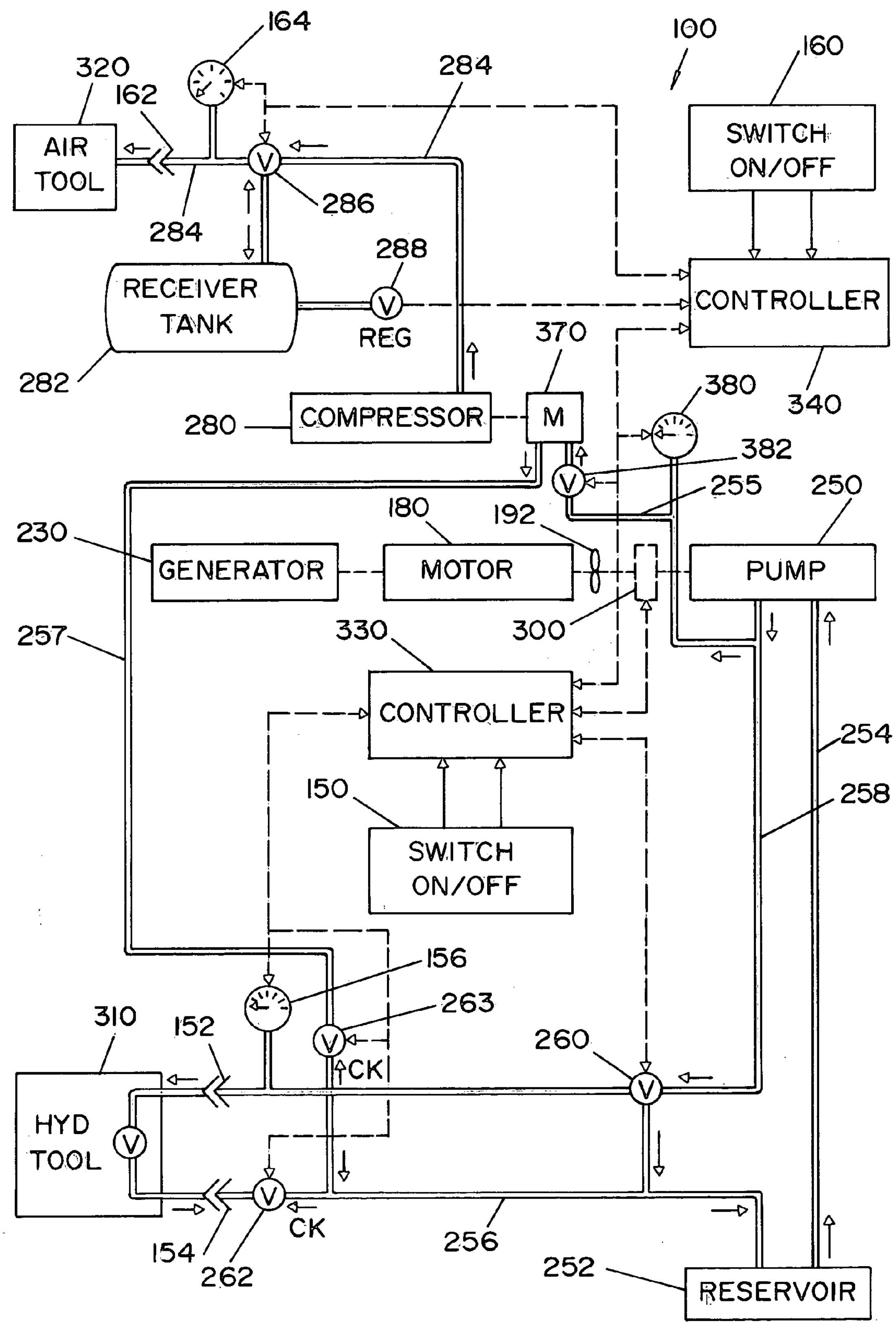
FIG. 10 is still another schematic representation of a hydraulic unit and a compressor unit integrated with an engine welder; and, FIG. 11 is a schematic representation of a hydraulic unit integrated with an engine welder in a hydraulic lift unit.

Referring now to FIG. 10, another arrangement of a hydraulic unit and air compressor unit integrated into an engine welder is disclosed. In this arrangement, the air compressor is powered by a hydraulic motor 370. The source of the hydraulic fluid for hydraulic motor 370 is the hydraulic unit incorporated into the engine welder. As shown in FIG. 10, hydraulic pump 250 directs hydraulic fluid into lines 258 and 255. Line 255 directs hydraulic fluid into hydraulic motor 370 when control valve 382 is open. Controller 340 of the air compressor unit can be designed to operate control valve 382. A pressure gauge 380 is connected to line 255 to indicate the hydraulic pressure in the line. If the detected hydraulic pressure in line 255 is too low and/or too high, the information from pressure gauge 380 can be used by controllers 330 and/or 340 to cause hydraulic pump 250 to increase the hydraulic fluid pressure in line 255. The hydraulic fluid flowing through hydraulic motor 370 flows through line 257 and back into the reservoir 252. A check valve 263 ensures that the hydraulic fluid does not backflow through hydraulic motor 370. The operation and/or control of the other components of the hydraulic unit and the compressor unit are similar to the control schemes previously discussed above.

Figure 5:
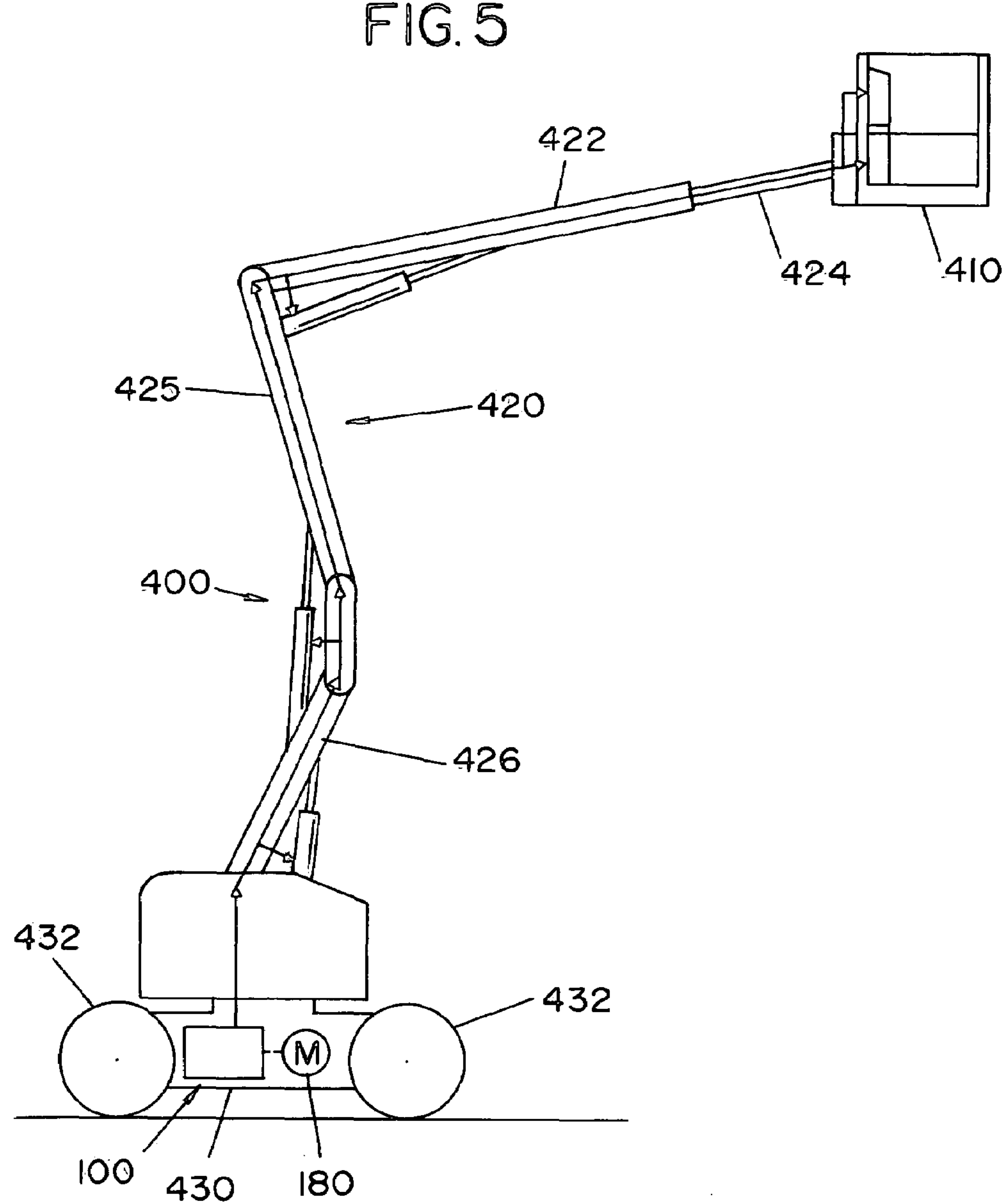
FIG. 5 is a side elevational view of a hydraulic lift unit that at least partially incorporates the engine welder of the present invention.
Figure 11:
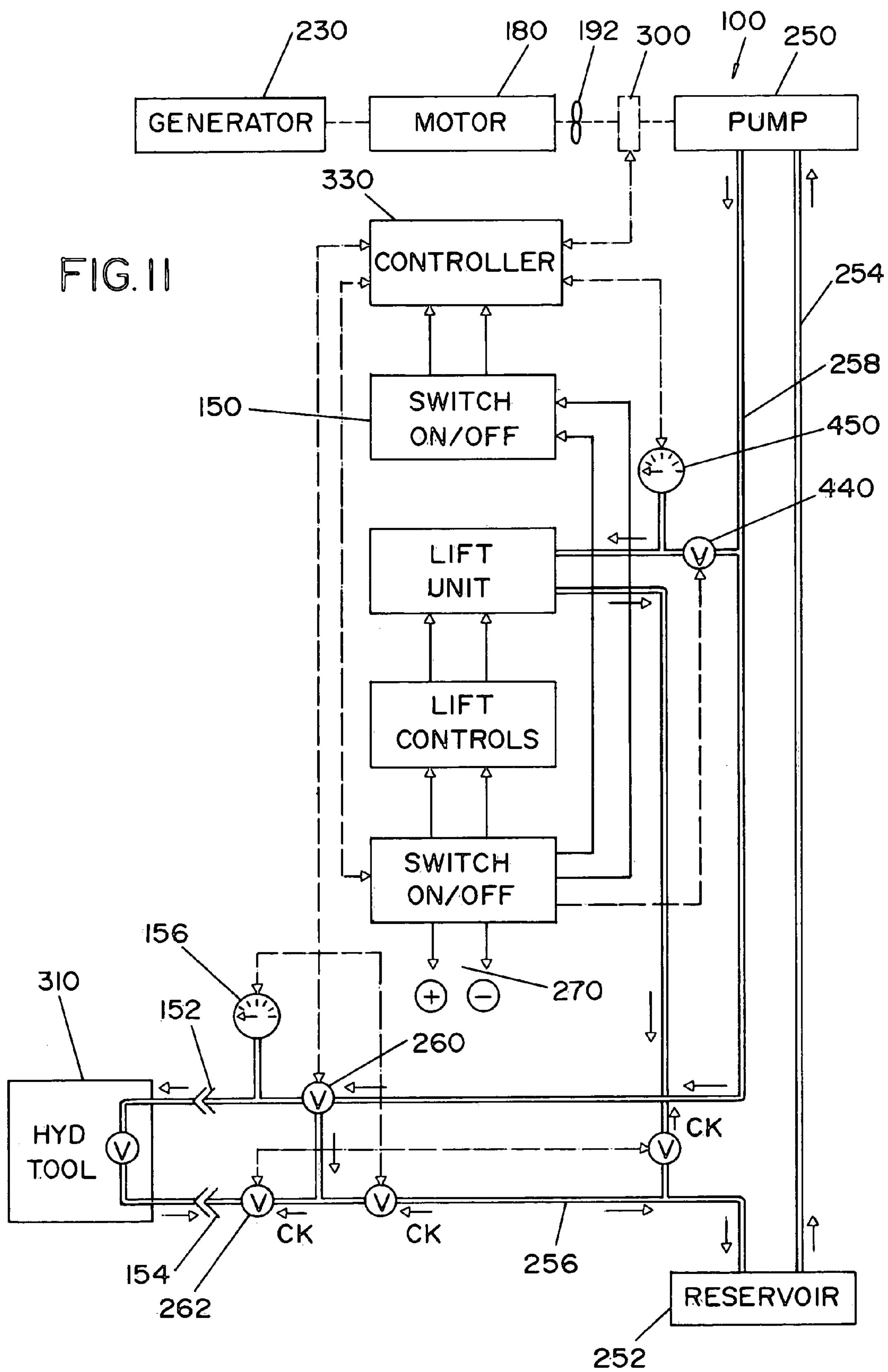

Referring now to FIGS. 5 and 11, there is illustrated a hydraulic lift system 400 and a schematic representation of powering one or more components of the hydraulic lift from the hydraulic unit in an engine welder. Hydraulic lift system 400 is designed to house and/or incorporate most of the components of an engine welder. In one design, the drive chassis 430 of the hydraulic lift system 400 includes a section wherein an engine welder can be mounted therein and connected to the components of the hydraulic lift system. In another arrangement, the chassis of the hydraulic lift system incorporates various components of the engine welder so as to integrate the components of the engine welder in the chassis itself. Referring now to FIG. 11, hydraulic pump 250 is illustrated as being directly connected to motor 180 or interconnected to motor 180 via clutch 300 so as to power the hydraulic pump. As can be appreciated, pump 250 can be powered by an electric motor. The hydraulic fluid pumped through hydraulic pump 250 is supplied to the lift unit via line 258. A valve 440 is designed to allow hydraulic fluid into the components of the lift unit when the lift unit is activated. FIG. 11 also illustrates that one or more hydraulic tools could also be operated in addition to the operation of the lift unit; however, such a design is optional. Controller 330 can be designed to receive information from a pressure gauge 450 and to use such information to activate and deactivate hydraulic pump 250 when the hydraulic fluid demand to the lift unit increases or decreases.

Referring now to FIG. 5, a schematic elevational view of a hydraulic lift system 400 is shown. The hydraulic lift system includes a personnel platform 410 attached to the load-receiving end of a three-section, Z-shaped articulating boom 420. The upper section 422 of the articulating boom 420 is attached to the personnel platform 410 and telescopes 424. The middle and lower sections 425 and 426 define a raising linkage. The raising linkage extends from a turntable that is mounted on a drive chassis 430. The turntable and the drive chassis form the base of the lift system. The articulating boom is designed such that it can extend upward and/or can be lowered into a stowed position. The drive chassis can be operated like a vehicle to move the lift system to any desired location on the work site. As is known in the art, the drive speed of the drive chassis is typically reduced when the articulating boom is raised from the stowed position. The turntable is rotatably mounted on the drive chassis so that the upper section can extend in any direction from the drive chassis. A drive motor of a drive system is typically mounted below the turntable, although the drive system may be mounted elsewhere. The drive motor can be electric powered and/or hydraulically powered such as by the hydraulic unit of the engine welder. Typically, the hydraulic lift includes one or more electrical controls to operate the lift. The electrical controls can be powered by battery, an external power source, and/or by the generator of the engine welder. The engine welder is typically housed in and/or connected to the drive chassis 430. The hydraulic unit of the engine welder is also used to supply hydraulic fluid to one or more component of the hydraulic lift. As shown in FIG. 5, the drive chassis includes four wheels 432. The personnel platform 410 may include any number of features needed to meet the requirements of a given application. For example, the personnel platform may have room for one or more workers and one or more toolboxes. Further, the personnel platform may include a 180-degree platform rotation mechanism, which allows the platform to be aligned in any desired direction, or the platform may include attachments such as a jib boom, which offers further flexibility of movement of the platform. The platform can also include a cage and a standing base. Controls are typically provided on the platform for operating the articulating boom and the drive system. The components of the lift system described thus far are standard in the industry, and their assembly and operation are well known in the art. As can be appreciated, the platform can include one or more components of an arc welder to enable one or more operators in the platform to execute one or more welding operations. For example, one or more welding controls can be included on the platform to enable an operator to set the welder for certain welding condition and/or to start or stop the welder. The platform may also include various connectors and/or welding accessories such as, but not limited to, a wire feeder for a welding gun, welding gun holder, welding gas connectors to connect to a remote gas source, gas cylinder holders, electrode holders, tool box, etc. The operation of the lift system will be readily understood by those skilled in the art and others from the foregoing description. For example, the position of the personnel platform may be raised or lowered by using a number of controls mounted on the platform. Supplying or withdrawing hydraulic fluid to or from one or more cylinders on the boom causes the boom to lift and/or lower. As will be readily understood by those skilled in this art, there are numerous articulating boom positions where the personnel platform is offset from the drive chassis by an amount sufficient to apply a tilt force on the turntable and the drive chassis.

It will be appreciated that the present invention provides a self-contained, portable and fully integrated unit 100 that can be easily and conveniently transported to various work sites for use in welding, providing auxiliary electric power, hydraulic fluid and/or providing pressurized air. In addition, the housing of the internal combustion engine, electric alternator, hydraulic system and the air compressor (when included) results in a noise level reduction, thereby improving the work environment. Furthermore, the combined welder and hydraulic system and air compressor (when included) in the housing facilitates in the quick and easy connection and removal of welding equipment, electrical equipment, and/or hydraulic tools and/or air tools (when a compressor system is included) on the housing.

The invention has been described with reference to a preferred embodiment and alternatives thereof. It is believed that many modifications and alterations to the embodiments disclosed readily suggest themselves to those skilled in the art upon reading and understanding the detailed description of the invention. It is intended to include all such modifications and alterations insofar as they come within the scope of the present invention.

I claim:

1. An integrated welder, generator and hydraulic unit comprising:

a. a housing that at least partially contains components of said welder, generator and hydraulic unit;

b. an engine at least partially mounted within said housing;

c. an electric current generator at least partially mounted within said housing and connected to said engine to be driven thereby; and, d. a hydraulic unit at least partially mounted within said housing, said hydraulic unit including a hydraulic pump that is powered by said engine, said current generator, and combinations thereof, wherein said housing includes at least one electrical outlet for use by welding equipment and at least one hydraulic fluid outlet for use by hydraulic powered equipment.

2. The unit as defined in claim 1, wherein said hydraulic pump is powered by a primary drive, auxiliary drive, and combinations thereof of said engine by a belt arrangement, a gear arrangement, and combinations thereof.

3. The unit as defined in claim 2, including a clutch to engage and disengage said hydraulic pump from said belt arrangement, said gear arrangement, and combinations thereof.

4. The unit as defined in claim 1, wherein said hydraulic pump is powered by an electric motor that is electrically connected to said electric current generator.

5. The unit as defined in claim 1, including an accumulator at least partially mounted within said housing, said accumulator fluidly connected to said hydraulic pump.

6. The unit as defined in claim 1, including a monitor to monitor a pressure, a flow rate, and combinations thereof of a hydraulic fluid in said hydraulic unit.

7. The unit as defined in claim 6, wherein said monitor generates a control signal to activate or deactivate said hydraulic pump based at least partially on a detected pressure, detected flow rate, and combinations thereof of said hydraulic fluid.

8. The unit as defined in claim 1, including a hydraulic fluid access on an exterior surface of said housing.

9. The unit as defined in claim 1, including an air compressor at least partially mounted within said housing.

10. The unit as defined in claim 9, wherein said air compressor is powered by said engine, said current generator, and combinations thereof.

11. The unit as defined in claim 9, including a receiver tank at least partially mounted within said housing, said receiver tank fluidly connected to said air compressor.

12. The unit as defined in claim 11, including a pressure monitor to monitor a pressure in said receiver tank.

13. The unit as defined in claim 12, wherein said pressure monitor generates a control signal to activate or deactivate said air compressor based at least partially on a detected air pressure level in said receiver tank.

14. The unit as defined in claim 9, including an air pressure gauge on an exterior surface of said housing.

15. The unit as defined in claim 9, including a pressurized air access on an exterior surface of said housing.

16. The unit as defined in claim 1, wherein said housing includes at least one pressurized air outlet.

17. The unit as defined in claim 1, wherein said housing includes wheels to enable said housing to be moved over a ground surface.

18. The unit as defined in claim 17, wherein said movement of said housing on said wheels is powered by said hydraulic unit.

19. The unit as defined in claim 17, wherein said movement of said housing on said wheels is powered by said electric generator.

20. The unit as defined in claim 1, wherein said housing is positioned on a lift unit, said lift unit is powered by said hydraulic unit.

21. A welder generator comprising:

a generator housing;

an engine mounted within said generator housing;

an electric current generator mounted within said generator housing and driven by said engine; and a hydraulic pump mounted within said generator housing, said hydraulic pump powered by said engine, said electric current generator, and combinations thereof, wherein said generator housing includes at least one electrical outlet for use by welding equipment and at least one hydraulic fluid outlet for use by hydraulic powered equipment.

22. An integrated welder, generator and hydraulic unit combination comprising:

a generator housing or a hydraulic unit housing having internal components mounted thereto, said internal components comprising:

means for generating a welding current;

means for generating a hydraulic pressure; and means for driving both said means for generating a welding current and said means for generating a hydraulic pressure, wherein said housing includes at least one electrical outlet for use by welding equipment and at least one hydraulic fluid outlet for use by hydraulic powered equipment.

* * * * *

UNITED STATES PATENT AND TRADEMARK OFFICE

CERTIFICATE OF CORRECTION

PATENT NO. : 7,642,487 B2
APPLICATION NO. : 10/911325
DATED : January 5, 2010
INVENTOR(S) : Nino V. Silvestro It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1324 days.

Signed and Sealed this

Sixteenth Day of November, 2010

David J. Kappos
*Director of the United States Patent and Trademark Office*